United States Patent [19]

Dobler et al.

[11] Patent Number: 4,549,430
[45] Date of Patent: Oct. 29, 1985

[54] SENSOR

[75] Inventors: Klaus Dobler; Rudolf Heinz, both of Gerlingen; Ulrich Schoor, Stuttgart; Thomas Frey, Rutesheim, all of Fed. Rep. of Germany

[73] Assignee: Robert Bosch GmbH, Stuttgart, Fed. Rep. of Germany

[21] Appl. No.: 597,588

[22] Filed: Apr. 10, 1984

Related U.S. Application Data

[63] Continuation of Ser. No. 346,034, Jan. 28, 1982, abandoned.

[30] Foreign Application Priority Data

Jul. 25, 1980 [DE] Fed. Rep. of Germany ....... 3028188

[51] Int. Cl.⁴ .......................................... G01M 19/00
[52] U.S. Cl. .................................................... 73/115
[58] Field of Search ..................... 73/115, 35, 753; 313/118; 123/145 A, 551

[56] References Cited

U.S. PATENT DOCUMENTS

| 1,609,688 | 12/1926 | Briggs | 123/145 A |
| 1,861,021 | 5/1932 | Martin | 73/115 |
| 1,897,811 | 2/1933 | Martin | 73/115 |
| 2,163,518 | 6/1939 | Postlethwaite | 73/115 |
| 2,879,450 | 3/1959 | Baker | 73/35 |
| 4,036,050 | 7/1977 | Dooley et al. | 73/115 |
| 4,227,403 | 10/1980 | Dooley et al. | 73/115 |
| 4,232,545 | 11/1980 | Dobler et al. | 73/115 |
| 4,345,555 | 8/1982 | Oshima et al. | 123/145 A |
| 4,380,973 | 4/1983 | Steinke | 123/145 A |

FOREIGN PATENT DOCUMENTS

| 834485 | 5/1960 | United Kingdom. |
| 981793 | 6/1961 | United Kingdom. |
| 966527 | 8/1964 | United Kingdom. |
| 443270 | 12/1974 | U.S.S.R. | 73/753 |

OTHER PUBLICATIONS

Machine Design, Heft 42-"Carbon Resistor Forms Throw-Away Transducer", One Page 147, vol. 42, Nov. 1970.

Primary Examiner—Charles Frankfort
Assistant Examiner—David R. Schuster
Attorney, Agent, or Firm—Frishauf, Holtz, Goodman & Woodward

[57] ABSTRACT

A conductor (5) which varies its resistance value under the influence of pressure is introduced into the combustion chamber of the engine. In one embodiment the conductor is a wire (5), a coil, a meander pattern or the like; preferably, one part (5a) of the wire arrangement is shielded from the pressure. The shielded (5a) and the unshielded (5b) parts of the wire arrangement then form the branches of a bridge circuit. The sensor is preferably disposed in the breathing room (11) of a spark plug or for a Diesel engine, combined with an electric conductor (21, 44) serving to provide pre-glowing in a glow plug. Combustion pressures are thus sensed for controlling and/or regulating injection systems and/or ignition systems without requiring additional bores.

8 Claims, 6 Drawing Figures

SENSOR

This application is a continuation of application Ser. No. 346,034, filed Jan. 28, 1982 now abandoned.

STATE OF THE ART

The invention is based on a sensor of the general type described by the main claim and by the associated claims 3 and 5.

Various apparatuses are already known for measuring the pressure in a medium by detecting the exertion of force upon a sensor disposed in the medium. Sensors which are suitable for this purpose include not only piezoceramic apparatuses but also those having a wire which varies its resistance under the influence of pressure, such as those described by way of example in the textbook by F. X. Eder entitled Moderne Messmethoden der Physik [Modern Measurement Methods in Physics], Part I, page 259, published in 1968 by the VEB-Verlag der Wissenschaften. In particular, manganin wire and iso-ohmic wire or the like are suitable pressure-sensitive wires.

The known sensors of this general type have the disadvantage, however, not only of substantial cost but also that their characteristics vary greatly when there are differences in temperature, and they are not suited to specialized tasks such as when the pressure in the combustion chamber of an internal combustion engines or in associated units is to be measured.

Actually, internal combustion engines only appear to function continuously. Although torque and rpm are quasicontinuous output variables, they are brought about by a series of individual processes ocurring in rapid succession.

In the course of optimizing the functioning of internal combustion engines, particularly with a view to reducing fuel consumption, it is accordingly necessary to detect these interrelationships individually, in order to be able to exert an influence in a desired manner on the process as a whole by influencing the individual process.

The prerequisite in this case is ascertaining the status of the interior of the internal combustion engine. Typical status variables are pressure and temperature, which given an ideal gas indicate the overall status. It is true that the operation of engines with internal combustion is determined substantially by chemical processes and changes in the combination of substances as well, so that engine operation cannot be completely described by the parameters of pressure and temperature; still, the observation of pressure and temperature provides sufficient information of the variations in status variables occurring over the engine cycle.

It is known to ascertain the propagation of the combustion process over time and in space, to ascertain the instant of injection, to ascertain injection processes and to gauge regular combustion occurrences, all within the combustion chamber of an internal combustion engine.

One phenomenon among these irregular combustions is "knocking", which occurs in engines under certain operating conditions. Knocking is understood to mean acoustic-frequency oscillations of the compressed fuel-air mixture which are caused by a shock wave. During these oscillations, the transfer of heat to the walls of the engine pistons and cylinders is greatly increased. The consequence of this is a harmful thermal overload on these surfaces, so that knocking is absolutely to be avoided. For optimum utilization of the available operational range of the engine, means must be provided which will indicate knocking early and reliably, so that the engine then is operated just below the knocking limit.

THE INVENTION

It is an object to provide a pressure sensing element particularly adapted for use with ICEs, which is simple and does not require additional openings in the combustion chamber portion of the cylinder of the ICE.

Briefly, a conductor element which is of a material changing its resistance characteristics under the influence ambient or external pressure applied thereto is placed within the combustion chamber of the ICE; depending on the type of the ICE, the material may be formed as a wire secured to an element already passing through the cylinder head of the ICE, for example by being incorporated within the breathing space surrounding the central insulator of a spark plug or being associated with a glow plug to "pre-glow" a Diesel engine.

When associated with a spark plug, a wire of pressure-sensitive material, typically in form of a wire coil is located in the breathing space and, preferably, a portion of the wire is shielded from exposure to pressure the entire wire will, however, assume the temperature within the combustion chamber of the ICE so that, upon bringing terminals out from both wire portions, and connecting them in a Wheatstone bridge, temperature effects are automatically compensated and pressure effects, only, can be measured in the form of electrical signals across the bridge. In the case of glow plugs, the materials used to provide for pre-glowing resistances, are chosen to be pressure-sensitive so that, after pre-glowing, the very same conductor which is used to pre-heat the interior of the combustion chamber of the ICE can be used to sense pressure variations. The pressure-sensitive conductor can be applied, for example to a ceramic tube forming part of the glow plug.

The sensor according to the invention has the advantage that particularly high measurement sensitivity is attained and that it is inexpensive. Temperature effects can be eliminated by a bridge circuit.

A conventional spark plug, available commercially can be used as a sensor carrier element. This has the additional advantage that a separate sensor bore in the cylinder head can be avoided.

The same advantage can be obtained for a Diesel engine where the electric conductor of a glow plug, which is already at hand for the purpose of effecting pre-glowing, is put to use as a pressure-sensitive element.

A particularly good result is obtained by using layer-type or conductor track on a ceramic sheathed-element glow plug, intended for pre-glowing, as the pressure sensing conductor. Because this conductor track, for its part, is usually surrounded by a dense protective layer, there are many possibilities for selection of the material comprising the conductor track, so that a material can be selected with which the effect of pressure and/or temperature is particularly well defined by the change in resistance.

DRAWING

The invention is shown in the drawing and explained in further detail in the following description. Shown are:

FIG. 1 a first exemplary embodiment of a sensor according to the invention;

FIG. 2 a modification of one detail of the sensor arrangement of FIG. 1, the wire being partially shielded;

FIG. 3 a sensor disposed in a spark plug;

FIG. 4 a schematic illustration of a further sensor arrangement according to the invention; and FIGS. 5a and b, a section and a view, respectively, of a ceramic sheathed-element glow plug such as may be used in an arrangement according to FIG. 4.

DESCRIPTION OF THE EXEMPLARY EMBODIMENTS

Figure 1:
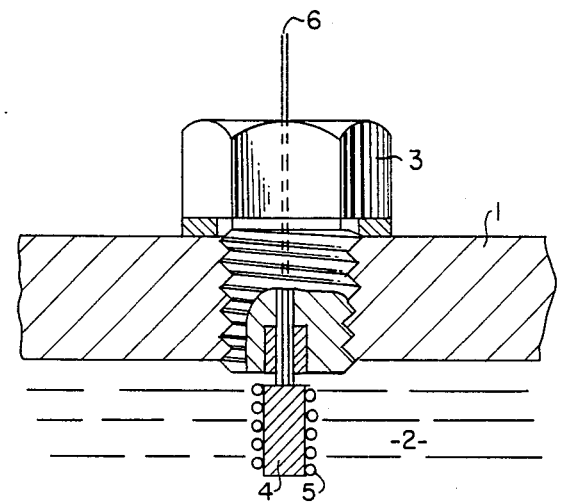
Figure 2:
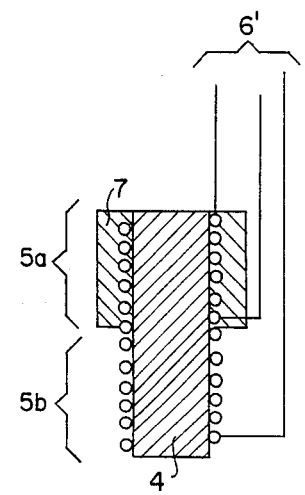

In the form of embodiment of a sensor according to the invention as shown in FIG. 1, reference numeral 1 indicates the wall of a container in which a pressure medium 2 is located. A cylindrical screw 3 is disposed in the wall 1 and on the side of the pressure chamber it carries a carrier body 4 on which a wire 5 is wound, which has the physical characteristic that it varies its resistance in accordance with the pressure exerted upon it. Manganin wires and isochromatic or iso-chromic wires or the like are particularly suitable for this purpose. The wire 5 is embodied in the form of a coil, a meander pattern or the like, so that there is a long wire length disposed over a small area and thus there is a large change in resistance when the pressure varies. The wire 5 is connected via supply lines 6, which are carried to the outside in a pressure-resistant manner, to a measurement apparatus not shown in FIG. 1. The resistance of the wire 5 is monitored in this measurement apparatus in a manner known per se. The wall 1 may be, by way of example, a combustion cylinder wall or the housing wall of an injection pump, so that with the apparatus shown in FIG. 1, the combustion chamber pressure or the pressure within an injection pump can be measured. However, it is naturally understood that other, preferably high pressures can be measured as well using the apparatus here described. In the further form of embodiment of a sensor according to the invention shown in FIG. 2, a bridge circuit is illustrated using the example of a coiled apparatus. The wire 5 is again wound up in coiled fashion on a carrier body 4; however, a first part 5a of the wire is surrounded by a pressure-resistant shield 7 and the other part 5b of the wire is located, unshielded, in the pressure medium. The parts 5a, 5b of the wire are carried to the outer chamber via a three-wire line 6'. In the outer chamber, the parts 5a, 5b are connected, for instance, with two further resistors to make a complete Wheatstone bridge circuit. The part 5a of the wire, preferably covered by a layer of plastic or metal, acts as a reference resistor for compensating for the effects of temperature.

It is naturally understood that the arrangements in the form of a coil or a meander pattern are provided solely by way of example, and a multitude of other geometric shapes can also be used for the wire, so long as a long length of wire is disposed over a small area.

Figure 3:
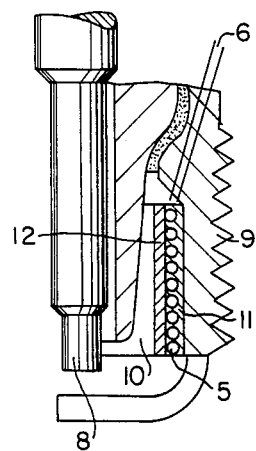

In the form of embodiment of a sensor according to the invention as shown in FIG. 3, a conventional spark plug is used, which has a so-called breathing room 10 located between the insulator surrounding the middle electrode 8 and the outer threaded metal housing 9. This breathing room 10, is suitable for receiving a sensor arrangement according to the invention in such a manner that a wire coil 5 is introduced, for instance on the inside of the spark plug housing 9. The wire coil 5 is preferably provided with a protective layer 11 and—if needed—with an electrical insulation layer 12. The supply line 6 is carried to the outside by way of the interior of the spark plug. With this arrangement, it is possible to monitor the pressure in the combustion chamber of an internal combustion engine, since the pressure of the combustion gas is transmitted onto the coil 5. It is naturally also possible to divide the coil 5 in the manner described above and shown in FIG. 2.

Figure 4:
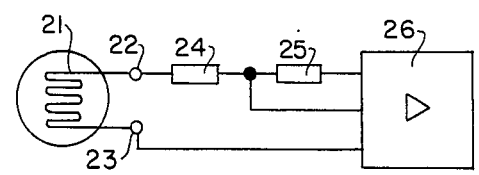

In FIG. 4, an electric conductor 21 is of a kind conventionally used in a glow plug for pre-glowing in self-igniting internal combustion engines, especially Diesel engines. Such glow plug conductors 21 are known in the various forms in the prior art. The conductor 21 of the glow plug is coupled to terminals 22, 23, by means of which on the one hand the conductor is supplied with a current required for glowing, from a current source not shown in the drawing, but by means of which on the other hand its resistance value is ascertained in accordance with the invention. This is accomplished, in the exemplary embodiment shown in FIG. 4, with the aid of a half bridge circuit, comprising the resistors 24 and 25 in cooperation with the electric conductor 21. The resistors 24 and 25 are connected in series, and one end point of this series circuit as well as the central point are connected to circuit 26, while the other end point is connected to the terminal 22. The terminal 23 is also connected to the circuit 26. The circuit 26 encompass, first, an amplifier known per se for electrical signals, preferably an amplifier such as is used for evaluating signals from wire strain gauges. The circuit 26 may furthermore contain an evaluation circuit for knocking signals, such as is described by way of example in Published, German Patent Application DE-OS No. 30 10 324.

It will naturally be understood that the conductor 21 varies its electrical characteristics under the influence not only of the pressure prevailing in the combustion chamber but also of the temperature prevailing there. Thus the apparatus shown in FIG. 4 can be used in the same manner, depending on the material used for the conductor 1, for measuring the combustion chamber temperature or for analyzing the course of the temperature with a view to gauging the combustion process.

Figure 5B:
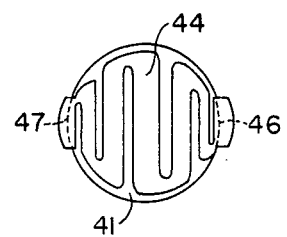
Figure 5A:
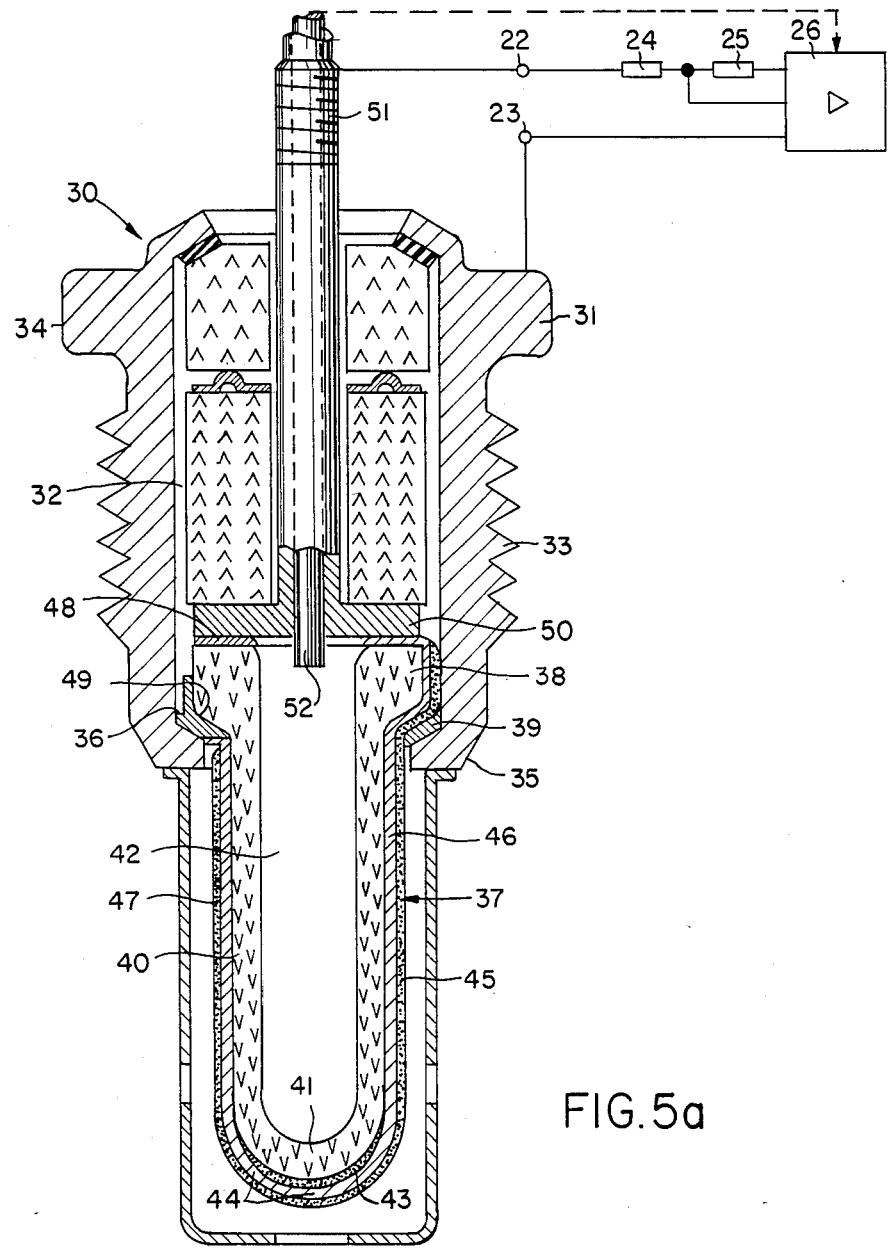

In FIGS. 5a and b, a ceramic sheathed-element glow plug in shown, such as is described in detail in German Published Patent Application DE-OS No. 31 04 401.8, to which U.S. Ser. No. 267,516, ESPER et al., now Patent No. 4,418,661, December 6, 1983, assigned to the assignee of this application, corresponds. The glow plug 30 has tubular metal housing 31, whose longitudinal bore is indicated by reference numeral 32 and which has on its exterior an insertion thread 33, a hexagonal area 34 for wrench access, and a sealing seat 35 disposed on the end section toward the combustion chamber, these elements being intended to facilitate its installation in an engine, not shown. The longitudinal housing bore 32 is provided on its end section toward the combustion chamber with a shoulder 36, on which a glow body 37 rests with an outwardly extending flange 38. A copper contact ring 39 is embedded between the glow plug flange 38 and the longitudinal bore shoulder 36 of the metal housing 31; the contact ring 39 simultaneously serves as a seal between the glow body 37 and the housing 31.

As its carrier, the glow body 37 has a ceramic tube 40, which is closed on its end toward the combustion chamber by a base 41 and protrudes out from the end section of the metal housing toward the combustion chamber. The ceramic tube 40 is made of electrically insulating ceramic material or glass ceramic, preferably of aluminum oxide, and on its end section protruding out of the housing 31 is has an outer diameter of approximately 5 mm. The area of the base 41 has a wall thickness of 0.5 mm; however, it may also be between 0.3 and 0.8 mm thick, depending on the usage of such a glow plug 30. In order to provide the glow body 37 with the least possible heat capacity, the wall thickness of the ceramic tube 40 preferably remains substantially uniform up to the flange 38, and the interior 42 of the ceramic tube 42 is left substantially unfilled. The base 41 is embodied in the form of a dome, but it may also be of some other configuration.

The base 41 of the ceramic tube 40 is covered on its outside with a thin, porous, electrically insulating interlayer 43, which is preferably of aluminum oxide, absorbs heat expansions and prevents an excessively rapid transfer of heat from the heating element 44 to the ceramic tube 40. However, the interlayer 43 may be extended on the ceramic tube 40 in the direction of the ceramic tube flange 38.

The heating element 44 is substantially restricted to the area of the ceramic tube base 41, is embodied in layer form, and comprises a platinum-rhodium alloy, which is treated with ceramic material, such as aluminum oxide. Instead of the platinum-rhodium alloy, other platinum metals, alloys of platinum metals or other suitable electrically insulating substances (Ag-Perowskite, for example) can also be used for the heating element 44. As may be seen in FIG. 5b, the heating element 44 in the present example has an undulating configuration, which provides a high energy density. The heating element 44 occupies a smaller area on the ceramic tube base 41 than does the interlayer 43. This heating element 44 is covered with an electrically insulating, dense protective layer 45 of ceramic material, for instance aluminum oxide, which protects the heating element against abrasion, corrosion and short-circuiting.

The heating element 44 is connected at respective ends with a first conductor track 46 and a second conductor track 47, respectively, which are made of a mixture of platinum and aluminum oxide, but which may also be made of other platinum metals or alloys of platinum metals or other suitable electrically insulating substances (such as Ag-Perowskite) and a ceramic material. The first conductor track 46 leads upward to the top of the end face 48 of the ceramic tube flange 38 and is connected there with a contact element 50, which terminates on the side remote from the combustion chamber in a contact thread 51, which is connected to the terminal 22. The second conductor path 47, in contrast, already terminates prior to the side 49 of the flange toward the combustion chamber and is connected via the copper contact ring 39 with the metal housing, which is connected in turn to the terminal 23.

By means of the half bridge circuit, comprising the resistors 24 and 25, the resistance value of the conductor track comprising the sections 44, 46, 47 is now ascertained and—as described in detail above—evaluated in the circuit 26.

Since the ceramic tube 40 of the glow plug as shown in FIGS. 5a and b is transparent because of the thinness of its wall, a preferred embodiment of the invention further provides an optical receiver in the form of a fiber-optical rod 52, which intercepts the light from the combustion chamber passing through the ceramic tube 40 and into its interior 42. The light detected via the fiber-optical rod 52 is carried further, in a manner known per se, converted into electrical signals and evaluated, as is indicated in FIG. 5a by the connection of the fiber-optical rod 52 with the circuit 26.

We claim:

1. Combination glow plug and combustion pressure sensor for providing pre-glowing heat and for ascertaining pressure in the combustion chamber of an internal combustion engine comprising:

an insulated support carrier (40) located to be positioned within the combustion chamber of the engine upon assembly of the plug-sensor combination to the engine;

an electrical conductor positioned on said support carrier and comprising a material which changes its resistance under the influence of pressure against its surface, and hence located to be positioned within the combustion chamber of the engine upon assembly of the senor to the engine;

connection means (22, 23) coupled to said conductor for applying electrical energy thereto for heating the space surrounding the conductor and thereby provide for pre-heating of the combustion chamber of the engine;

and a resistance evaluation circuit (24, 25, 26) additionally coupled to said connection means for determining the resistance of the conductor, said conductor (21) thereby having the dual function of pre-heating or pre-glowing for starting of the engine and pressure sensing for determination of operating pressure in the combustion chamber of the engine.

2. Sensor according to claim 1 wherein said electrical conductor (21) is formed as a conductive track (44) secured to a portion of the support carrier (40).

3. Sensor according to claim 1 wherein the support carrier comprises an essentially cylindrical ceramic element (40) having a closed bottom region (41);

and said conductor (21) comprises a conductive track or layer-like conductor applied to the bottom region of said cylindrical element.

4. Sensor according to claim 1 wherein said support carrier comprises a hollow ceramic tube (40) having a closed bottom (41) adapted for location within the combustion chamber of the engine, and said conductor (21) comprises a conductive track, or layerlike conductor position in the region of the closed bottom (41) of the ceramic tube.

5. Sensor according to claim 4 further comprising an electrically insulating, dense protective layer (45) covering the conductive track, or layer-like conductor (44).

6. Sensor according to claim 1 wherein the conductor is applied in form above a conductive track, or layer-like conductor having a meander, or wave configuration.

7. Sensor according to claim 4 wherein the conductor is applied in form above a conductive track, or layer-like conductor having a meander, or wave configuration.

8. Sensor according to claim 7 further comprising an electrically insulating, dense protective layer (45) covering the conductive track, or layer-like conductor (44).

* * * * *